United States Patent
Lo et al.

(10) Patent No.: US 12,256,094 B2
(45) Date of Patent: Mar. 18, 2025

(54) METHODS AND APPARATUSES OF SHARING PRELOAD REGION FOR AFFINE PREDICTION OR MOTION COMPENSATION

(71) Applicant: MEDIATEK INC., Hsinchu (TW)

(72) Inventors: Chih-Hsuan Lo, Hsinchu (TW);
Tzu-Der Chuang, Hsinchu (TW);
Ching-Yeh Chen, Hsinchu (TW);
Chun-Chia Chen, Hsinchu (TW);
Chih-Wei Hsu, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 273 days.

(21) Appl. No.: 17/736,144

(22) Filed: May 4, 2022

(65) Prior Publication Data

US 2023/0362403 A1 Nov. 9, 2023

(51) Int. Cl.
*H04N 19/52* (2014.01)
*H04N 19/176* (2014.01)
*H04N 19/423* (2014.01)

(52) U.S. Cl.
CPC .......... *H04N 19/52* (2014.11); *H04N 19/176* (2014.11); *H04N 19/423* (2014.11)

(58) Field of Classification Search
CPC ..... H04N 19/52; H04N 19/176; H04N 19/423
See application file for complete search history.

(56) References Cited

U.S. PATENT DOCUMENTS

| 11,425,415 | B2 | 8/2022 | Huang et al. | |
|---|---|---|---|---|
| 2018/0199057 | A1* | 7/2018 | Chuang | H04N 19/573 |
| 2020/0077113 | A1* | 3/2020 | Huang | H04N 19/167 |
| 2021/0235083 | A1* | 7/2021 | Liu | H04N 19/186 |
| 2022/0109868 | A1* | 4/2022 | Zhang | H04N 19/176 |
| 2023/0328225 | A1* | 10/2023 | Li | H04N 19/577 |
| | | | | 375/240.15 |

FOREIGN PATENT DOCUMENTS

| CN | 112840646 A | 5/2021 |
|---|---|---|
| WO | 2020/084473 A1 | 4/2020 |

OTHER PUBLICATIONS

Chinese language office action dated Jul. 19, 2023, issued in application No. TW 111133511.

* cited by examiner

*Primary Examiner* — Zhubing Ren
(74) *Attorney, Agent, or Firm* — McClure, Qualey & Rodack, LLP (57) ABSTRACT

Video encoding or decoding methods and apparatuses include receiving input data associated with a current block in a current picture, determining a preload region in a reference picture shared by two or more coding configurations of affine prediction or motion compensation or by two or more affine refinement iterations, loading reference samples in the preload region, generating predictors for the current block, and encoding or decoding the current block according to the predictors. The predictors associated with the affine refinement iterations or coding configurations are generated based on some of the reference samples in the preload region.

21 Claims, 8 Drawing Sheets

METHODS AND APPARATUSES OF SHARING PRELOAD REGION FOR AFFINE PREDICTION OR MOTION COMPENSATION

FIELD OF THE INVENTION

The present invention relates to inter coding methods and apparatuses for encoding or decoding video data. In particular, the present invention relates to affine prediction and motion compensation in video coding systems.

BACKGROUND AND RELATED ART

The Versatile Video Coding (VVC) standard is the latest video coding standard developed by the Joint Collaborative Team on Video Coding (JCT-VC) group of video coding experts from ITU-T Study Group. In the VVC Draft, a picture is divided into one or more tile rows and one or more tile columns, where a tile is a sequence of Coding Tree Units (CTUs) that covers a rectangular region within a particular tile column and a particular tile row in the picture. The feature of tiles was mainly for parallel processing purposes, and tile partitioned rectangular slices forming subpictures may also be used in viewport based 360 degrees video applications. The processing order for tile partition of a picture is tile raster scan within the picture and CTU raster scan within a tile. Tiles break in-picture prediction dependencies as well as entropy decoding dependencies. A slice consists of an integer number of complete tiles or an integer number of consecutive complete CTU rows within a tile of a picture. The feature of slices is mainly used for subpicture level access and ultralow delay. Each subpicture in a picture contains one or more slices that collectively cover a rectangular region of the picture, and each subpicture contains multiple complete CTUs. Subpictures in a picture allow independent coding and extraction of a rectangular subset of a sequence of coded pictures for use cases like viewport-dependent 360 degrees video streaming optimization and region of interest applications. Subpictures allow motion vectors of a coding block pointing outside of the subpicture even when the subpicture is extractable, thus allowing padding at subpicture boundaries as picture boundaries.

Affine Motion Compensation Prediction In the development of the VVC standard, block-based affine transform motion compensation prediction is an alternative inter prediction coding tool to the traditional translation motion compensation prediction. The affine motion field of a block is described by motion information of two control points in a 4-parameter affine motion model or by motion information of three control points in a 6-parameter affine motion model. For a 4-parameter affine motion model, a motion vector at a sample location (x,y) in a block is derived by the following equation.

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad \text{Equation (1)}$$

For a 6-parameter affine motion model, a motion vector at a sample location (x,y) in a block is derived by the following equation.

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{Equation (2)}$$

where ($mv_{0x}$, $mv_{0y}$) is the motion vector of the top-left corner control point, ($mv_{1x}$, $mv_{1y}$) is the motion vector of the top-right corner control point, and ($mv_{2x}$, $mv_{2y}$) is the motion vector of the bottom-left corner control point.

Figure 1:
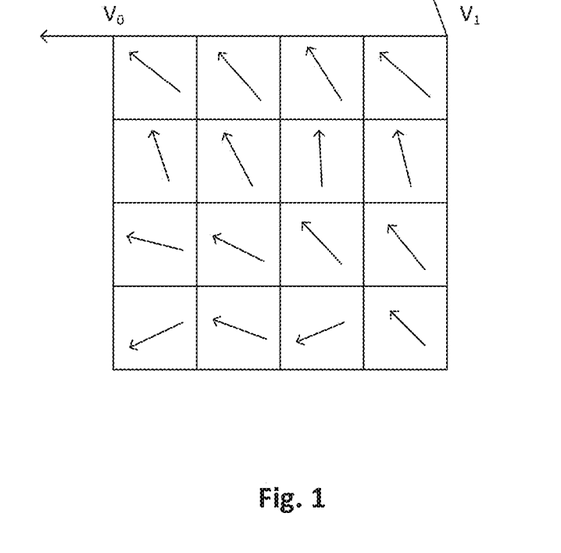
FIG. 1 illustrates an example of an affine motion vector field for a block in a CU coded by affine motion compensation prediction using a 4-parameter affine model.

The luma Coding Block (CB) of a Coding Unit (CU) is split into 4×4 subblocks. FIG. 1 illustrates an example of an affine motion vector field for each 4×4 sub-block in a CU coded by affine motion compensation prediction. To derive a motion vector of each 4×4 luma subblock in an affined coded CU, the motion vector of the center sample of each subblock is calculated according to the affine model as shown in Equation (1) or (2) and rounded to 1/16 fraction accuracy. Motion compensation interpolation filters are applied to generate the prediction signal of each sub-block with the derived sub-block motion vector. The sub-block size of chroma components is also set to be 4×4 samples. The MV of a 4×4 chroma sub-block is calculated as the average of the MVs of the four corresponding 4×4 luma sub-blocks.

There are two affine motion inter prediction modes including affine Merge mode and affine Advance Motion Vector Prediction (AMVP) mode. Affine Merge mode can be applied to CUs with both width and height larger than or equal to 8 samples. In this mode, the control point MVs of a current CU is generated based on motion information of spatial neighboring CUs. There can be up to five Control Point Motion Vector Predictor (CPMVP) candidates and an index is signaled to indicate the one to be used for the current CU. Three types of CPMVP candidates are used to form an affine Merge candidate list, including inherited affine Merge candidates that extrapolated from the control point MVs of neighboring CUs, constructed affine Merge candidates CPMVPs that are derived using translational MVs of neighboring CUs, and zero MVs.

Figure 2:
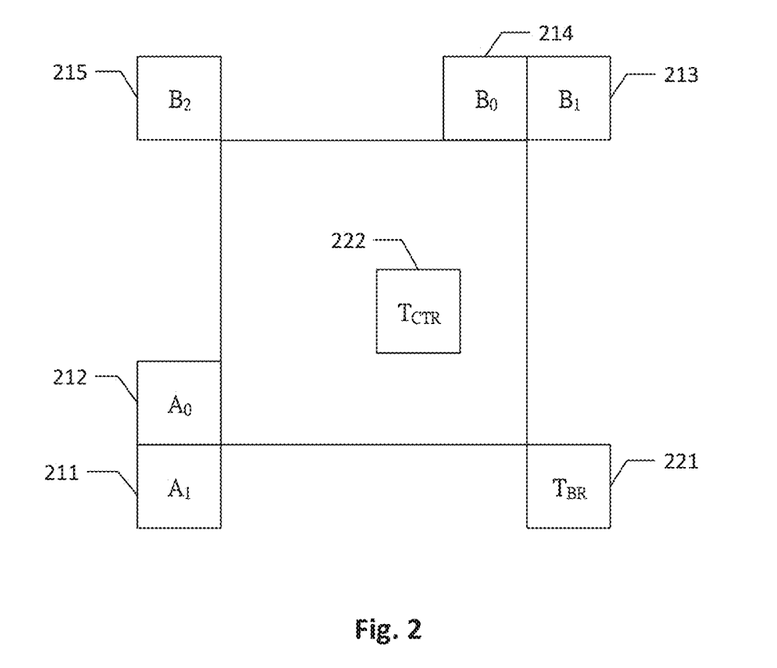
FIG. 2 illustrates locations of spatial candidates and temporal candidates for constructing a Merge candidate list for the regular Merge mode according to the VVC standard.
Figure 3:
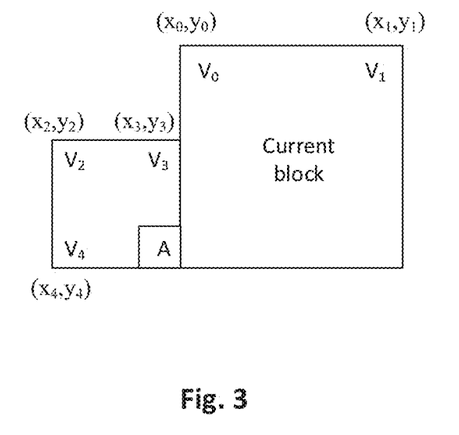
FIG. 3 illustrates an example of control point motion vector inheritance for constructing an affine Merge candidate list for a current block.

There are a maximum of two inherited affine candidates, which are derived from the affine motion model of neighboring blocks, one from left neighboring CUs and one from above neighboring CUs. The scan order of candidate positions for the left predictor is A0 212 then A1 211 as shown in FIG. 2. The scan order of candidate positions for the above predictor is B0 214, B1 213, followed by B2 215 as shown in FIG. 2. Only the first inherited candidate from each side is selected. The two inherited candidates will not be checked for redundancy. In cases when a neighboring affine CU is identified, its control point motion vectors are used to derive the CPMVP candidate in the affine Merge list of the current CU. FIG. 3 illustrates control point motion vector inheritance, and as shown in FIG. 3, when the neighboring left bottom block A is coded in affine mode, motion vectors v2, v3, and v4 of the top left corner, above right corner, and left bottom corner of the CU which contains the block A are attained. When the CU containing the block A is coded with the 4-parameter affine model, the two control point MVs of the CU are calculated according to motion vectors v2 and v3. When the CU containing the block A is coded with the 6-parameter affine model, the three control point MVs of the CU are calculated according to motion vectors v2, v3, and v4.

Figure 4:
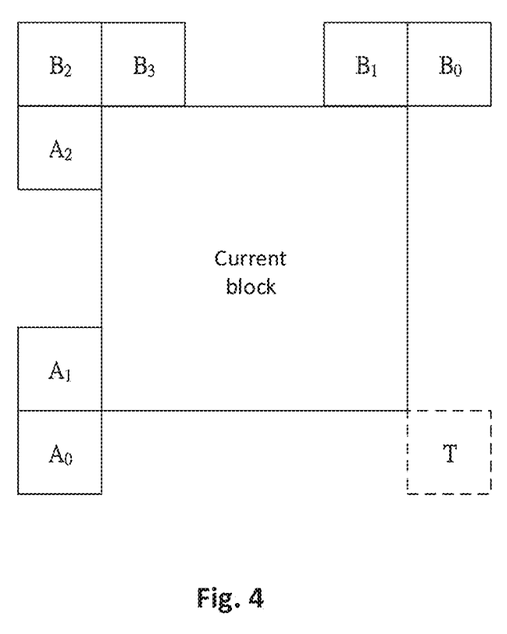
FIG. 4 illustrates locations of spatial and temporal neighbors for generating a constructed affine candidate by combining neighbor translational motion information of each control point.

Constructed affine Merge candidate is constructed by combining the neighboring translational motion information of each control point. The motion information for the control point is derived from the specified spatial neighbors and temporal neighbor as shown in FIG. 4. CPMVk (k=1, 2, 3, 4) represents the k-th control point. For CPMV1, the checking order is B2, B3, then A2, and the MV of the first available block is used. For CPMV2, the checking order is B1 then B0, and for CPMV3, the checking order is A1 then A0. The temporal MVP is used as CPMV4 if it is available.

After MVs of four control points are attained, affine Merge candidates are constructed based on the motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}. The combination of 3 CPMVs constructs a 6-parameter affine Merge candidate and the combination of 2 CPMVs constructs a 4-parameter affine Merge candidate. To avoid the motion scaling process, if the reference indices of control points are different, the related combination of control point MVs is discarded. After inherited affine Merge candidates and constructed affine Merge candidate are checked, if the list is still not full, zero MVs are inserted to the end of the list.

The affine AMVP mode can be applied for CUs with both width and height larger than or equal to 16 samples. An affine flag in a CU level is signaled in the video bitstream to indicate whether the affine AMVP mode is used and then another flag is signaled to indicate whether a 4-parameter affine or 6-parameter affine model is used. In the affine AMVP mode, the difference of the control point MVs of a current CU and their predictors CPMVPs are signaled in the video bitstream. The affine AMVP candidate list size is 2 and it is generated by using four types of control point MV candidates in order. The first type of control point MV candidates is inherited affine AMVP candidates that extrapolated from control point MVs of the neighboring CUs. The second type is constructed affine AMVP candidate CPMVPs that are derived using the translational MVs of the neighboring CUs. The third type of control point MV candidates is translational MVs from neighboring CUs, and the fourth type is the zero MVs. The checking order of inherited affine AMVP candidates is the same as the checking order of inherited affine Merge candidates. The only difference is that only the affine CU having the same reference picture as the reference picture of the current block is considered when generating the inherited affine AMVP candidate. A pruning process is not applied when inserting an inherited affine motion predictor into the candidate list. A constructed AMVP candidate is derived from specified spatial neighbors as shown in FIG. 4. The same checking order is used in deriving a constructed affine AMVP candidate and deriving an affine Merge candidate. In addition, a reference picture index of the neighboring block is also checked. The first block in the checking order that is inter coded and has the same reference picture as the current CU is used. There is only one constructed AMVP candidate when the current CU is coded with a 4-parameter affine model and both of the two CPMVs are available, these two CPMVs are added as one candidate in the affine AMVP candidate list. The three CPMVs are added as one candidate in the affine AMVP candidate list when the current CU is coded with a 6-parameter affine model and all three CPMVs are available. Otherwise, the constructed AMVP candidate is set as unavailable. In cases when the number of candidates in the affine AMVP candidate list is less than 2 after checking inherited affine AMVP candidates and constructed AMVP candidate, one or more available CPMVs will be added as the translational MVs to predict all control point MVs of the current CU. Finally, zero MVs are used to fill the affine AMVP candidate list if it is still not full.

Subblock-based Temporal Motion Vector Prediction (SbTMVP) The sub-block concept of affine motion compensation prediction is extended to the CU level temporal motion vector prediction in the Merge mode. Subblock-based Temporal Motion Vector Prediction (SbTMVP) allows inheriting motion information at a sub-block level from the collocated reference picture. Each sub-block of a CU can have its own motion information without explicitly transmitting the block partition structure or motion information, enabling diverged motion compensation within a CU without any additional cost. Sub-block motion information derivation in SbTMVP includes deriving a Displacement Vector (DV) for a current CU, checking the availability of the SbTMVP candidate and deriving a central motion. The sub-block motion information is derived from the corresponding sub-block identified by the DV. The derived sub-block level motion information is used for the motion compensation of both luma and chroma CBs of the CU. SbTMVP applies a DV to find the correspondence of the positions or the partitioned blocks in the current picture and those in the collocated picture. The MV of the left neighboring CU of the current CU is selected to be the DV if the left neighboring CU uses the collocated picture as its reference picture. In case the left neighboring CU is not coded in an inter prediction mode or the motion information does not point to the collocated picture, the DV is set to (0,0). The DV is then applied to the central position of the current CU to locate the displaced central position of the current CU to locate the displaced central position in the collocated picture. The SbTMVP candidate is considered not available if the block containing the displaced central position is not inter-coded. Otherwise, the motion information of the central position of the current CU is derived from the motion information of the block containing the displaced central position in the collocated picture. Up to two motion vectors, one per list, can be derived. The DV is applied to find the corresponding subblock in the collocated picture for each sub-block of the current CU when the SbTMVP candidate is available. The motion information of the subblock in the current CU is derived according to the motion information of the corresponding sub-block in the same way as deriving the central motion. The motion information of the current sub-block is set to be the central motion when the corresponding sub-block of the current sub-block is not inter-coded. SbTMVP is applicable to CUs with both width and height larger than or equal to 8 luma samples. The sub-block size for SbTMVP is set to 8×8 in order to restrict the memory bandwidth consumption not exceeding the worse-case situation in 8×8 bi-prediction. The location of the corresponding sub-block is clipped to be within a constrained area after applying the DV.

BRIEF SUMMARY OF THE INVENTION

Embodiments of video encoding or decoding methods for a video coding system receive input data associated with a current block in a current picture, determine a preload region in a reference picture for two or more coding configurations of affine prediction or motion compensation or for two or more affine refinement iterations, load reference samples in the preload region into a memory buffer, generate predictors for the current block, and encode or decode the current block according to the predictors. The predictors associated with the two or more affine refinement iterations or coding configurations are generated based on respective portions of the reference samples in the preload region. The predictors associated with the affine refinement iteration or coding configurations are generated based on the portions of the reference samples in the preload region without loading other reference samples in the reference picture according to some embodiments of the present invention. In various embodiments of the present invention, the coding configurations of affine prediction or motion compensation include a combination of affine uni-directional prediction, affine bi-directional prediction, 4-parameter affine prediction, 6-parameter affine prediction, inter prediction, Merge prediction, and SbTMVP. For example, the two or more affine refinement iterations are associated with affine uni-directional prediction or affine bi-directional prediction performed on the reference picture. In one embodiment, the preload region is determined by uni-directional prediction and the preload region is reused by bi-directional prediction. In another embodiment, the preload region is determined by 4-parameter affine prediction or 4-parameter affine Merge motion compensation and the preload region is reused by 6-parameter affine prediction or 6-parameter affine Merge motion compensation. In yet another embodiment, the preload region is determined by a coding configuration of affine prediction or motion compensation and the preload region is reused by SbTMVP. The current block skips SbTMVP or uses padding if any of 4×4 sub-block Motion Vectors (MVs) of SbTMVP points to a reference sample out of the preload region.

Some embodiments of the video encoding or decoding method skip a search candidate when required data for affine prediction or motion compensation is not within the preload region. Some other embodiments of the video encoding or decoding method modify a search candidate when required data for affine prediction or motion compensation is not within the preload region. The search candidate is modified by modifying one or more affine Control Pint Motion Vectors (CPMVs) of the search candidate In one embodiment, the affine CPMVs are modified by constraining a distance of reference regions of two neighboring affine 4×4 sub-blocks. For example, the distance of reference regions of the two neighboring affine 4×4 sub-blocks is constrained to be smaller than 1 sample. In another embodiment, the affine CPMVs are modified by constraining an overlapped region of two neighboring affine 4×4 sub-blocks. For example, each dimension of the overlapped region of the two neighboring affine 4×4 sub-blocks is constrained to be less than 1 column or 1 row. In another embodiment, the affine CPMVs are modified by constraining a center Motion Vector (MV) difference between two neighboring affine 4×4 sub-blocks to be within a defined range. Some embodiments of modifying one or more affine CPMVs modify an affine model to ensure a farthest CPMV is within the preload region. Some embodiments of modifying one or more affine CPMVs clip one or more violated CPMVs within the preload region. Some embodiments of modifying one or more affine CPMVs switch the affine mode to a translation mode using an affine center MV as a translation MV to derive a new reference region. An embodiment of modifying one or more affine CPMVs switches the affine mode to a translation mode using an affine center MV as a translation MV to derive a new reference region and shifts the new reference region to be aligned with a boundary of the preload region.

The current block is a Coding Block (CB) or a Coding Unit (CU) according to some embodiments of the present invention. In some embodiments, a size of the current block is a width multiply by a height, and a size of the preload region is derived by multiplying 1.4 times of the width plus 7 and 1.4 times of the height plus 7.

Aspects of the disclosure further provide an apparatus for a video coding system. Some embodiments of the apparatus receive input video data associated with a current block in a current picture, determine a preload region in a reference picture for two or more coding configurations of affine prediction or motion compensation or for two or more affine refinement iterations, load reference samples in the preload region into a memory buffer, generate predictors for the current block, and encode or decode the current block according to the predictors. The predictors associated with the two or more affine refinement iterations or coding configurations are generated based on respective portions of the reference samples in the preload region.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention.

Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

Figure 5:
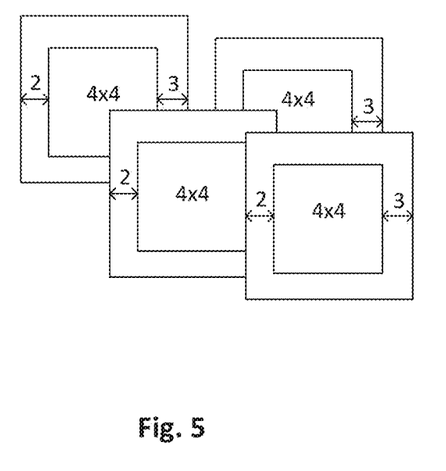
FIG. 5 illustrates irregular loading pattern associated with reference samples loading for 4×4 sub-blocks.

Affine CPMV Refinement According to the VVC standard, multiple CPMV refinement iterations are applied for determining final CPMVs in affine bi-directional prediction or uni-directional prediction for each reference picture. The number of CPMV refinement iterations in affine bi-directional prediction for each reference picture is 3, whereas the number of CPMV refinement iterations in affine uni-directional prediction for each reference picture is equal to 5 if a 4-parameter affine motion model is used or is equal to 4 if a 6-parameter affine motion model is used. The number of CPMV refinement iterations indicates the number of motion compensation required in the CPMV refinement process. In each CPMV refinement iteration, a pre-loading reference region for motion compensation, also referred to as a preload region, is altered based on the updated CPMVs, which results in extra pre-loading cycles and increasing timing consumption. Different bonding boxes of preload regions are used in uni-directional prediction and bi-directional prediction. The reference region required in performing motion compensation for each 4×4 sub-block may be partial overlapped with the reference regions of other 4×4 sub-blocks, causing irregular loading pattern for reference sample loading and bandwidth wasting as shown in FIG. 5. FIG. 5 illustrates an example of overlapping searching regions for four 4×4 sub-blocks.

Shared Preload Region for Affine CPMV Refinement Iterations or Coding Configurations Embodiments of the present invention determine and load a preload region of required data for affine prediction or motion compensation and this preload region can be reused in at least one other CPMV refinement iteration or one other coding configuration. In one embodiment, the same preload region is used for uni-directional prediction and bi-directional prediction in the same reference picture. For example, the preload region used for uni-directional prediction is reused for bi-directional prediction. In another embodiment, the same preload region is used for 4-parameter and 6-parameter affine prediction and affine Merge motion compensation. For example, the preload region used for 4-parameter affine prediction and affine Merge motion compensation is reused by 6-parameter affine prediction and affine Merge motion compensation. Embodiments of sharing the preload region for multiple CPMV refinement iterations or multiple coding configurations prevent bandwidth overhead caused by reloading reference samples in each CPMV refinement iteration or for each coding configuration. In some embodiments, a single preload region in a reference picture is shared for multiple coding configurations of affine prediction or motion compensation. Reference samples of the preload region in a reference picture are loaded into a memory buffer, and some portions of the reference samples in the preload region are used by the coding configurations. In some embodiments, although some portions of the reference samples in the preload region are reused by respective coding configurations, other reference samples in the reference picture may still be loaded and used by other coding configurations. In some embodiments, the preload region is reused by the coding configurations without loading other reference samples in the reference picture. Different coding configurations include affine uni-directional prediction, bi-directional prediction, 4-parameter affine prediction, 6-parameter affine prediction, inter prediction, Merge prediction, and SbTMVP. In some embodiments of reusing the preload region, a search candidate is skipped or modified to be within the preload region if required data for affine prediction or motion compensation is not within the preload region. For example, the search candidate is modified by altering one or more affine CPMVs so the new search range is within the preload region. Some embodiments of modifying the affine CPMVs include constraining a reference range distance or center MV difference between two 4×4 sub-block within a defined range will be described in the later section "CPMV Adjustment Constraints", and some other embodiments of modifying the affine CPMVs will be described in the later section "Modify Affine CPMVs to be within Preload Region".

The affine preload region is set as two times the area of reference samples needed by a translation mode according to embodiments of the present invention. That is, the size of an affine preload region is 1.4×(PU_width+7)×1.4×(PU_height+7), where PU_width and PU_height are the width and height of the current Prediction Unit (PU) under affine prediction. A 9×9 sample pattern is loaded per cycle from the preload region for affine motion compensation. In one embodiment, a shared reference preload region is determined by 4-parameter uni-directional prediction CPMVs for the affine Merge mode, and the shared reference preload region is used by uni-directional prediction and bi-directional prediction over both 4-parameter and 6-parameter affine mode. Reference samples in a preload region is pre-loaded into a memory buffer, such as a P/D delivery Static Random Access Memory (SRAM) before an affine 4-parameter uni-directional prediction Processing Element (PE) processes affine prediction. The size of a shared preload region for each reference picture is still equal to 1.4×(PU_width+7)×1.4×(PU_height+7) in some embodiments of the present invention.

Figure 6:
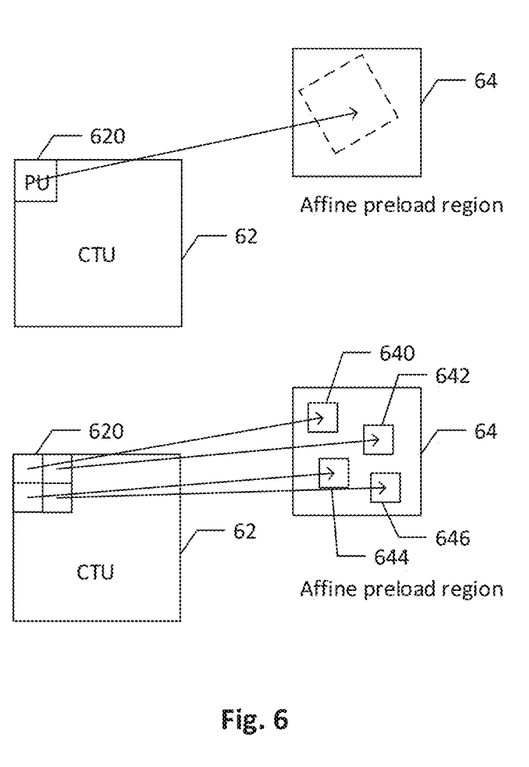
FIG. 6 illustrates reusing a preload region of affine prediction with SbTMVP according to an embodiment of the present invention.

Shared Preload Region with SbTMVP To further reduce the number of pre-loading cycles for SbTMVP at the motion compensation stage, SbTMVP shares the same reference preload region with affine prediction according to some embodiments of the present invention. In an embodiment, a current PU skips SbTMVP or uses padding if any of the 4×4 sub-block MVs points to a reference sample out of the shared preload region. FIG. 6 illustrates an embodiment of determining an affine preload region and reusing the affine preload region for SbTMVP. In FIG. 6, an affine preload region 64 is determined by an affine center MV of a current PU 620 in a current CTU 62. This affine preload region 64 is reused for performing SbTMVP as reference samples in the affine preload region 64 are fetched according to each SbTMVP 4×4 sub-block MV of the current PU 620.

Figure 7A:
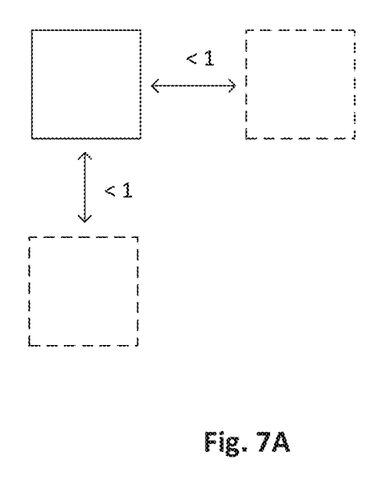
FIG. 7A and FIG. 7B illustrate constraints applied to reduce bandwidth of internal memory access according to some embodiments of the present invention.

CPMV Adjustment Constraints In some embodiments of the present invention, a CPMV adjustment constraint is set to reduce the bandwidth of internal memory access. The CPMV adjustment constraint constrains the distance of reference regions associated with two neighboring affine 4×4 sub-blocks to be smaller than 1 sample as shown in FIG. 7A. That is, the following equation is satisfied by any neighboring affine 4×4 sub-blocks, where w is the width and h is the height of the 4×4 sub-blocks in this embodiment.

$$\frac{(v_{1x} - v_{0x})}{w}, \frac{(v_{1y} - v_{0y})}{w}, \frac{(v_{2x} - v_{0x})}{h}, \frac{(v_{2y} - v_{0y})}{h} < \frac{1}{4}.$$

Figure 7B:
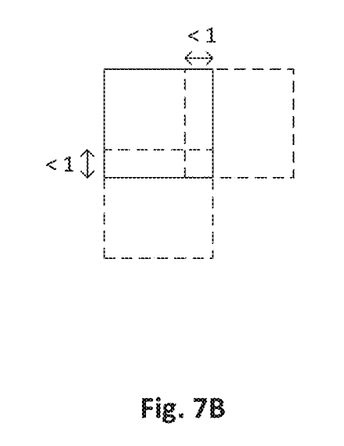

In some other embodiments of the CPMV adjustment constraint, the overlapping region of reference regions corresponding to two neighboring affine 4×4 sub-blocks is constrained. For example, the overlapped region associated with the two neighboring affine 4×4 sub-blocks is less than 1 column or 1 row as shown in FIG. 7B. This CPMV adjustment constraint avoids complex selection signals in the overlapped reference region. That is, the following equation is satisfied by any neighboring affine 4×4 sub-blocks, where w is the width and h is the height of the 4×4 sub-blocks in this embodiment.

$$\frac{(v_{1x} - v_{0x})}{w}, \frac{(v_{1y} - v_{0y})}{w}, \frac{(v_{2x} - v_{0x})}{h}, \frac{(v_{2y} - v_{0y})}{h} > -\frac{1}{4}.$$

In some embodiments of CPMV adjustment constraint, the center MV difference between two neighboring affine 4×4 sub-blocks is constrained to be within a defined range [a, b] according to an embodiment of the present invention.

Figure 8A:
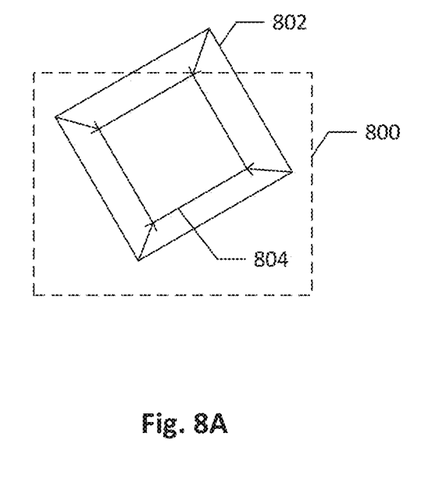
FIGS. 8A-8D illustrate four embodiments of modifying CPMVs when required reference data is out of the preload region.
Figure 8B:
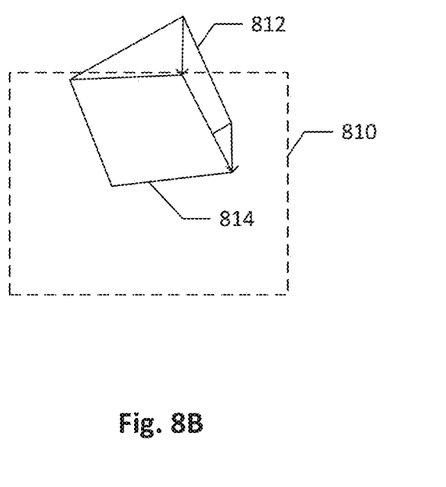
Figure 8C:
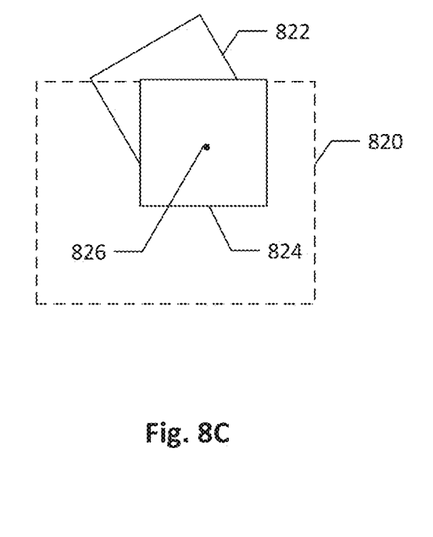
Figure 8D:
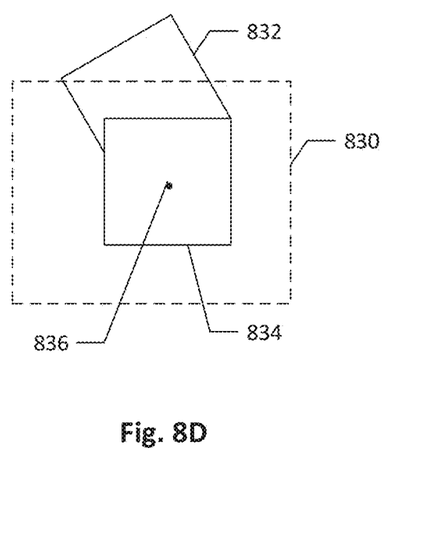

Modify Affine CPMVs to be within Preload Region In some embodiments of reusing the preload region in CPMV refinement iterations or reusing the preload region for multiple coding configurations, one or a combination of modifications can be applied if required reference data is out of the preload region. In an embodiment, the affine model is modified to ensure the farthest CPMV is still within the preload region when 4-parameter affine prediction is used; or violated CPMVs are clipped into the preload region when 6-parameter affine prediction is used. FIG. 8A illustrates an example of modifying the affine model to make sure the farthest CPMV is within the preload region according to this embodiment. FIG. 8B illustrates an example of directly modifying the violated CPMVs to be within the preload region according to this embodiment. In FIG. 8A, an original reference region 802 is changed into a new reference region 804 by modifying the 4-parameter affine model so the new reference region 804 is completely within the preload region 800 while the rectangular shape of the new reference region 804 is retained. In FIG. 8B, an original reference region 812 is changed into a new reference region 814 by clipping the violated CPMV into the preload region 810. In another embodiment, the violated CPMVs are clipped within the preload region, for example, on the boundary of the preload region, by using the translation mode when the affine reference region is flipped or out of the preload region as shown in FIG. 8C. In FIG. 8C, the affine mode is first switched to the translation mode when the original affine reference region 822 is flipped or out of the preload region 820, then the affine center MV 826 is adjusted to shift the new reference region 824 to be aligned with the boundary of the preload region 820. FIG. 8D illustrates yet another embodiment of CPMV adjustment. In this embodiment, the affine mode is directly switch to the translation mode by using the affine center MV 836 as the translation MV to derive a new reference region 834 when the affine reference region 832 is flipped or out of the preload region 830.

Figure 9:
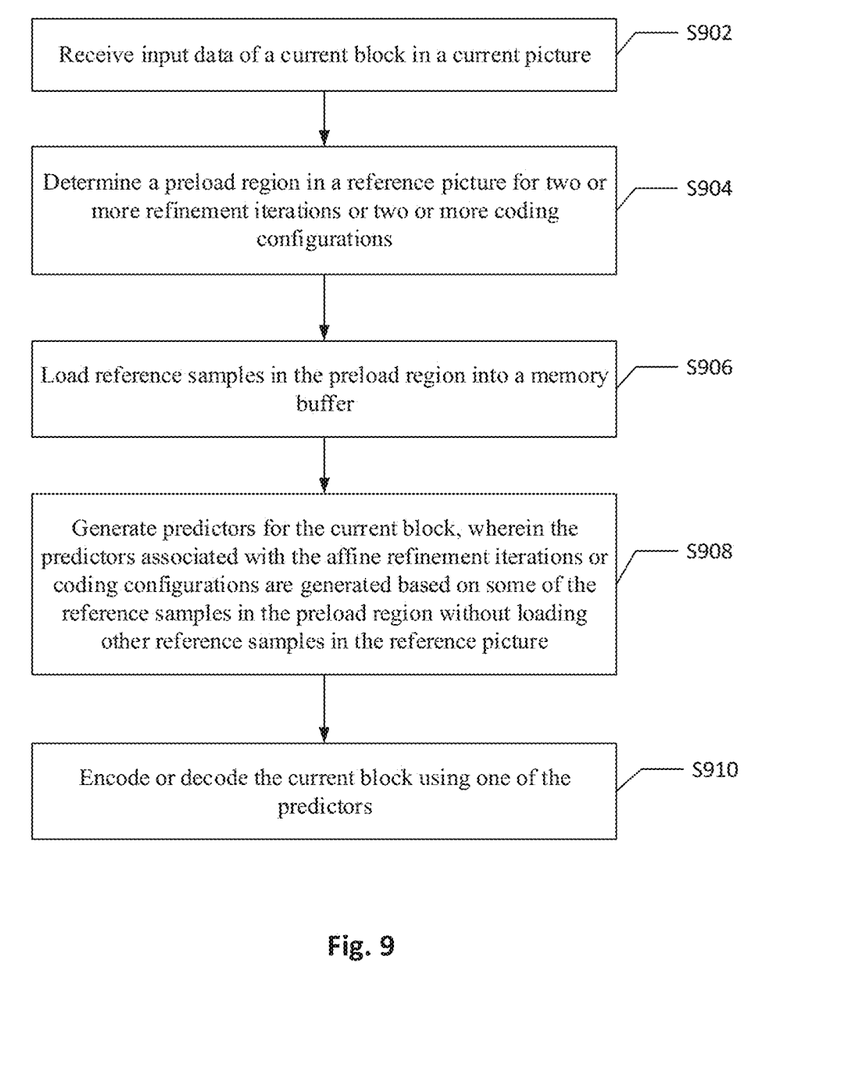
FIG. 9 is a flowchart of encoding or decoding a current block using a shared preload region for affine prediction or motion compensation according to an embodiment of the present invention.

Representative Flowchart for an Embodiment of Present Invention FIG. 9 is a flowchart illustrating an embodiment of a video encoding or decoding method sharing a preload region in multiple affine refinement iterations or for multiple coding configurations. A video coding system receives input data of a current block in a current picture in step S902 and determines a preload region in a reference picture for multiple affine refinement iterations or for multiple coding configurations in step S904. Reference samples in the preload region are loaded into a memory buffer in step S906. The video coding system generates predictors for the current block in step S908. The predictors for the current block associated with the affine refinement iterations or coding configurations are generated based on some of the reference samples in the preload region without loading other reference samples in the reference picture. In step S910, the current block is encoded or decoded using one of the predictors.

Exemplary Video Encoder and Video Decoder Implementing Present Invention Embodiments of the present invention may be implemented in video encoders and/or video decoders. For example, the disclosed video encoding or decoding methods may be implemented in an inter prediction module of a video encoder or an inter prediction module of a video decoder. Alternatively, any of the disclosed methods may be implemented as a circuit coupled to the inter prediction module of the video encoder or the inter prediction module of the video decoder, so as to provide the information needed by any of the modules.

Figure 10:
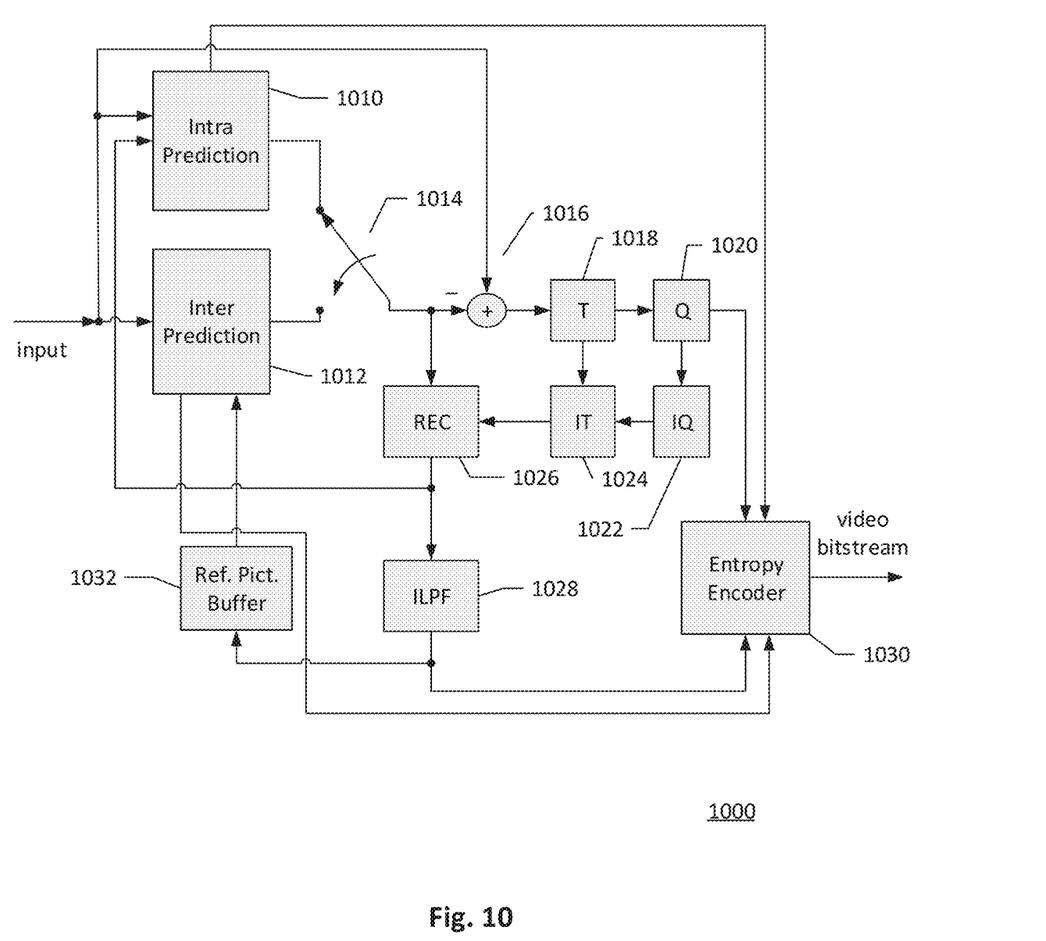
FIG. 10 illustrates an exemplary system block diagram for a video encoding system incorporating the video encoding method according to embodiments of the present invention.

FIG. 10 illustrates an exemplary system block diagram for a Video Encoder 1000 implementing one or more of the various embodiments of the present invention. The video Encoder 1000 receives input video data of a current block in a current picture. An Intra Prediction module 1010 provides intra predictors based on reconstructed video data of the current picture. An Inter Prediction module 1012 performs Motion Estimation (ME) and Motion Compensation (MC) to provide inter predictors based on referencing video data from other picture or pictures. In some embodiments of the present invention, a preload region in each reference picture is determined for two or more affine refinement iterations or for two or more coding configurations of affine prediction or motion compensation. Some examples of the coding configurations are affine uni-directional prediction, affine bi-directional prediction, 4-parameter affine prediction, 6-parameter affine prediction, inter prediction, Merge prediction, and SbTMVP. Reference samples in the preload region are loaded into a memory buffer of the Inter Prediction module 1012. A search candidate is skipped or modified when required data for affine prediction or motion compensation is not within the preload region according to some embodiments of the present invention. For example, one or more affine CPMVs of the search candidate are modified so a new reference range is within the preload region. In some embodiments, predictors of the current block in the affine refinement iterations are generated based on some of the reference samples in the preload region without loading other reference samples in the reference picture into the memory buffer. In some other embodiments, predictors of the current block for the coding configurations are generated based on some of the reference samples in the preload region without loading other reference samples in the reference picture into the memory buffer. Either the Intra Prediction module 1010 or Inter Prediction module 1012 supplies a selected predictor of the current block in the current picture using a switch 1014 to an Adder 1016 to form residues by subtracting the selected predictor from original video data of the current block. For example, the current block is a Coding Unit (CU). The residues of the current block are further processed by a Transformation module (T) 1018 followed by a Quantization module (Q) 1020. The transformed and quantized residual signal is then encoded by Entropy Encoder 1030 to form a video bitstream. The transformed and quantized residual signal of the current block is processed by an Inverse Quantization module (IQ) 1022 and an Inverse Transformation module (IT) 1024 to recover the prediction residues. As shown in FIG. 10, the residues are recovered by adding back to the selected predictor at a Reconstruction module (REC) 1026 to produce reconstructed video data. The reconstructed video data may be stored in a Reference Picture Buffer (Ref. Pict. Buffer) 1032 and used for prediction of other pictures. The reconstructed video data from the REC 1026 may be subject to various impairments due to the encoding processing, consequently, at least one In-loop Processing Filter (ILPF) 1028 is conditionally applied to the reconstructed video data before storing in the Reference Picture Buffer 1032 to further enhance picture quality. A deblocking filter is an example of the ILPF 1028. Syntax elements are provided to an Entropy Encoder 1030 for incorporation into the video bitstream.

Figure 11:
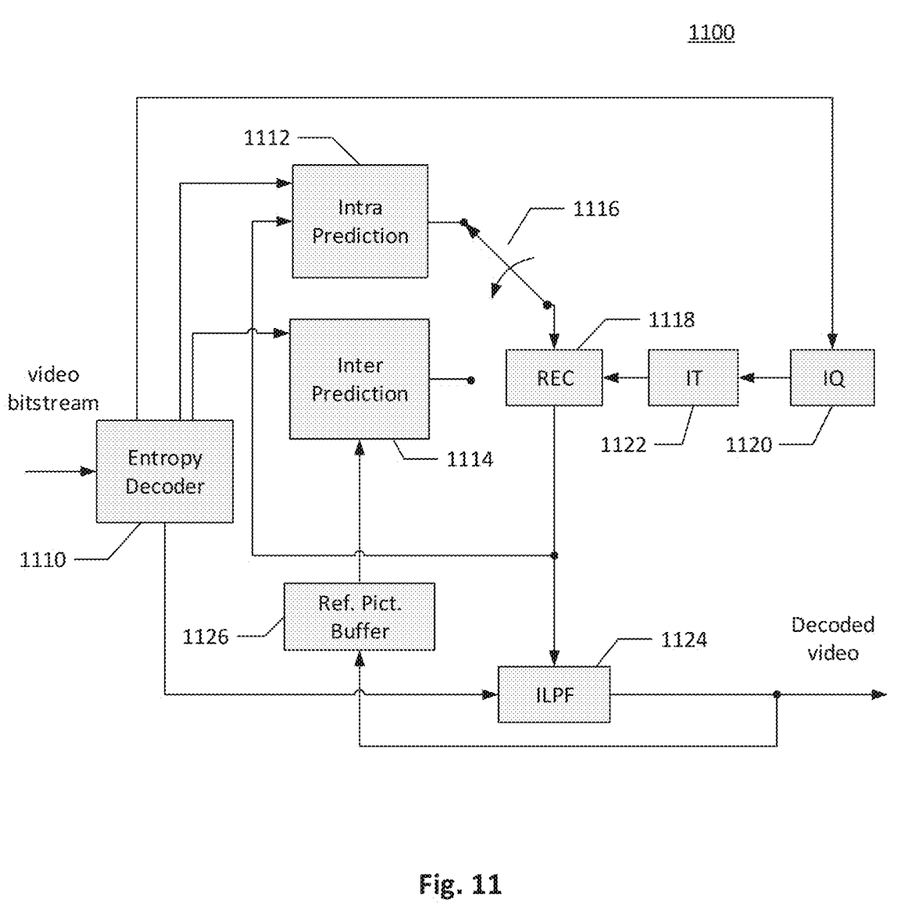
FIG. 11 illustrates an exemplary system block diagram for a video decoding system incorporating the video decoding method according to embodiments of the present invention.

A corresponding Video Decoder 1100 for the Video Encoder 1000 of FIG. 10 is shown in FIG. 11. The video bitstream encoded by a video encoder is the input to the Video Decoder 1100 and is decoded by an Entropy Decoder 1110 to parse and recover the transformed and quantized residual signal and other system information of a current picture. The decoding process of the Decoder 1100 is similar to the reconstruction loop at the Encoder 1000, except the Decoder 1100 only requires motion compensation prediction in an Inter Prediction module 1114. A current picture is received by the Entropy Decoder 1110, and each block in the current picture is decoded by either an Intra Prediction module 1112 or Inter Prediction module 1114. A Switch 1116 selects an intra predictor from the Intra Prediction module 1112 or Inter predictor from the Inter Prediction module 1114 according to decoded mode information. In some embodiments, a preload region in a reference picture is determined and reference samples of the preload region are loaded into a memory buffer for multiple affine refinement iterations or for multiple coding configurations. One or more affine CPMVs are modified when required data for affine prediction or motion compensation is not within the preload region according to some embodiments. The transformed and quantized residual signal is recovered by an Inverse Quantization module (IQ) 1120 and an Inverse Transformation module (IT) 1122. The IQ module 1120 is also called a de-quantization module. The recovered residual signal is reconstructed by adding back the predictor in a Reconstruction (REC) module 1118 to produce reconstructed video. The reconstructed video is further conditionally processed by at least one In-loop Processing Filter (ILPF) 1124 to generate final decoded video. A deblocking filter is one example of the ILPFs 1124. If the currently decoded picture is a reference picture, the reconstructed video of the currently decoded picture is also stored in a Reference Picture Buffer (Ref. Pict. Buffer) 1126 for later pictures in decoding order.

Various components of the Video Encoder 1000 and Video Decoder 1100 in FIG. 10 and FIG. 11 may be implemented by hardware components, one or more processors configured to execute program instructions stored in a memory, or a combination of hardware and processor. For example, a processor executes program instructions to control reusing a preload region for multiple affine refinement iterations or coding configurations. The processor is equipped with a single or multiple processing cores. In some examples, the processor executes program instructions to perform functions in some components in the Encoder 1000 and Decoder 1100, and the memory electrically coupled with the processor is used to store the program instructions, information corresponding to the reconstructed images of blocks, and/or intermediate data during the encoding or decoding process. In some examples, the Video Encoder 1000 may signal information by including one or more syntax elements in a video bitstream, and the corresponding Video Decoder 1100 derives such information by parsing and decoding the one or more syntax elements. The memory in some embodiments includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable mediums listed above. As shown in FIGS. 10 and 11, the Encoder 1000 and Decoder 1100 may be implemented in the same electronic device, so various functional components of the Encoder 1000 and Decoder 1100 may be shared or reused if implemented in the same electronic device. For example, one or more of the Reconstruction module 1026, Inverse Transformation module 1024, Inverse Quantization module 1022, In-loop Processing Filter 1028, and Reference Picture Buffer 1032 in FIG. 10 may also be used to function as the Reconstruction module 1118, Inverse Transformation module 1122, Inverse Quantization module 1120, In-loop Processing Filter 1124, and Reference Picture Buffer 1126 in FIG. 11, respectively.

Embodiments of more efficient video processing methods may be implemented in a circuit integrated into a video compression chip or program code integrated into video compression software to perform the processing described above. For examples, encoding or decoding one or more blocks in the current picture by inter coding may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding or decoding video data in a video coding system, comprising:
   receiving input data associated with a current block in a current picture;
   determining a preload region in a reference picture for two or more coding configurations of affine prediction or motion compensation or for two or more affine refinement iterations;

loading reference samples in the preload region into a memory buffer, the references samples comprising a group of pixel elements;

generating predictors for the current block, wherein the predictors associated with the two or more affine refinement iterations or for the two or more coding configurations of affine prediction or motion compensation are generated based on respective portions of the reference samples in the preload region, wherein the reference samples of the preload region loaded into the memory buffer and used for one of the two or more affine refinement iterations or one of the two or more coding configurations of affine prediction or motion compensation are reused, without reloading of the loaded reference samples, for another of the two or more affine refinement iterations or another of the two or more coding configurations of affine prediction or motion compensation; and encoding or decoding the current block according to the predictors.

2. The method of claim 1, wherein the two or more coding configurations of affine prediction or motion compensation comprise a combination of affine uni-directional prediction, affine bi-directional prediction, 4-parameter affine prediction, 6-parameter affine prediction, inter prediction, Merge prediction, and Subblock-based Temporal Motion Vector Prediction (SbTMVP).

3. The method of claim 2, wherein the two or more affine refinement iterations are associated with affine uni-directional prediction or affine bi-directional prediction performed on the reference picture.

4. The method of claim 2, wherein the preload region is determined by uni-directional prediction and is reused by bi-directional prediction.

5. The method of claim 2, wherein the preload region is determined by 4-parameter affine prediction or 4-parameter affine Merge motion compensation and is reused by 6-parameter affine prediction or 6-parameter affine Merge motion compensation.

6. The method of claim 2, wherein the preload region is determined by a coding configuration of affine prediction or motion compensation and is reused by SbTMVP.

7. The method of claim 6, wherein the current block skips SbTMVP or uses padding if any of 4×4 sub-block Motion Vectors (MVs) of SbTMVP points to a reference sample out of the preload region.

8. The method of claim 1, further comprising skipping a search candidate when required data for affine prediction or motion compensation is not within the preload region.

9. The method of claim 1, further comprising modifying a search candidate when required data for affine prediction or motion compensation is not within the preload region.

10. The method of claim 9, wherein modifying the search candidate comprises modifying one or more affine Control Point Motion Vectors (CPMVs) of the search candidate.

11. The method of claim 10, wherein the one or more affine CPMVs are modified by constraining a distance of reference regions of two neighboring affine 4×4 sub-blocks.

12. The method of claim 11, wherein the distance of reference regions of the two neighboring affine 4×4 sub-blocks is constrained to be smaller than 1 sample.

13. The method of claim 12, wherein the one or more affine CPMVs are modified by constraining an overlapped region of two neighboring affine 4×4 sub-blocks.

14. The method of claim 13, wherein each dimension of the overlapped region of the two neighboring affine 4×4 sub-blocks is constrained to be less than 1 column or 1 row.

15. The method of claim 10, wherein the one or more affine CPMVs are modified by constraining a center Motion Vector (MV) difference between two neighboring affine 4×4 sub-blocks to be within a defined range.

16. The method of claim 10, wherein the one or more affine CPMVs are modified by modifying an affine model to ensure a farthest CPMV is within the preload region.

17. The method of claim 10, wherein the one or more affine CPMVs are modified by clipping one or more violated CPMVs into the preload region.

18. The method of claim 10, wherein the one or more affine CPMVs are modified by switching the affine mode to a translation mode using an affine center MV as a translation MV to derive a new reference region.

19. The method of claim 10, wherein the one or more affine CPMVs are modified by switching the affine mode to a translation mode using an affine center MV as a translation MV to derive a new reference region and shifting the new reference region to be aligned with a boundary of the preload region.

20. The method of claim 1, wherein a size of the current block is a width multiply by a height, and a size of the preload region is derived by multiplying 1.4 times of the width plus 7 and 1.4 times of the height plus 7.

21. An apparatus for performing video encoding or decoding, comprising: a computer processor configured for receiving video data; and programming executable on the computer processor for video encoding by performing steps comprising:

receiving input data associated with a current block in a current picture;

determining a preload region in a reference picture for two or more coding configurations of affine prediction or motion compensation or for two or more affine refinement iterations;

loading reference samples in the preload region into a memory buffer, the references samples comprising a group of pixel elements;

generating predictors for the current block, wherein the predictors associated with the two or more affine refinement iterations or for the two or more coding configurations of affine prediction or motion compensation are generated based on respective portions of the reference samples in the preload region, wherein the reference samples of the preload region loaded into the memory buffer and used for one of the two or more affine refinement iterations or one of the two or more coding configurations of affine prediction or motion compensation are reused, without reloading of the loaded reference samples, for another of the two or more affine refinement iterations or another of the two or more coding configurations of affine prediction or motion compensation; and encoding or decoding the current block according to the predictors.

* * * * *